May 16, 1933.   M. H. FLYNN   1,909,147
METHOD FOR FORMING SCREWS
Filed June 18, 1931
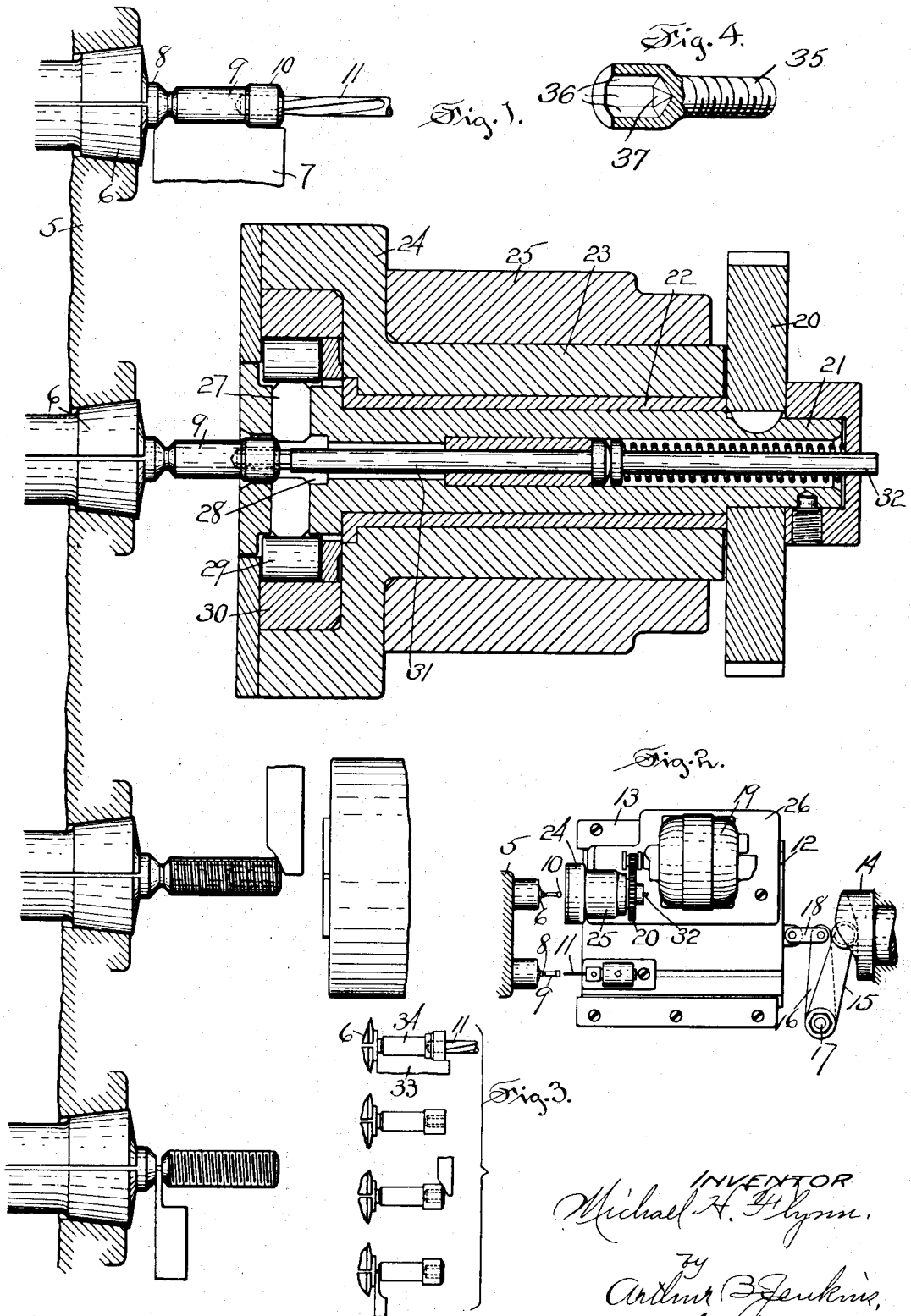

Patented May 16, 1933

1,909,147

UNITED STATES PATENT OFFICE

MICHAEL H. FLYNN, OF HARTFORD, CONNECTICUT, ASSIGNOR TO THE ALLEN MANUFACTURING COMPANY, OF HARTFORD, CONNECTICUT, A CORPORATION OF CONNECTICUT

METHOD FOR FORMING SCREWS

Application filed June 18, 1931. Serial No. 545,186.

My invention relates more particularly to the method by means of which screws having non-circular holes in the ends thereof for the reception of a wrench are produced, and an object of my invention, among others, is the production of high grade screws of this type in a particularly rapid and efficient manner.

One form of a machine embodying my invention and in the use of which my improved method may be practised and the objects herein set out, may be attained, is illustrated in the accompanying drawing, in which—

Figure 1 is a diagrammatic view illustrating the collet end of the spindle carrier of a multiple spindle machine embodying my improvement, said carrier being shown as developed on a flat plane, and the heading unit being cut in central lengthwise section and shown as supported in proper relation to the spindle, both supporting parts of the spindle and unit being omitted.

Figure 2 is a plan view on a much reduced scale illustrating the heading unit.

Figure 3 is a diagrammatic view illustrating the manner of forming cap screws.

Figure 4 is a view of a screw having the head cut in section to illustrate the flat facets produced by the practise of my invention.

My improved method for producing hollow-headed screws and which may be practised in one of several different ways in the machine illustrated and described herein, enables such screws to be made in a manner involving rapid production and a material decrease in the expense of making. Furthermore, the screws thus produced approach nearer the perfection limit than screws heretofore made by other methods.

In the accompanying drawing the numeral 5 denotes the spindle carrier of an automatic metal working machine, a portion of such carrier only being shown herein, and 6 denotes collets rotatably mounted in said carrier in a manner which will be readily understood by those skilled in the art, and for which reason a full showing as to such parts is omitted herein. Said collets are adapted to receive rods of metal that extend through the collet spindles and that are moved lengthwise in said spindles to project the ends of the rods beyond the faces of the collets in a manner that will be readily understood.

A cutting tool 7 is movably mounted for engagement with the end of a rod of stock 8 by means of which a screw blank 9 is formed having a reduced portion and a head 10. A drill 11 is mounted in any ordinary manner for engagement with the end of the blank to form a hole therein. After the screw blank has been formed by the tool 7 and the drill 11 the spindle carrier 5 is rotated a one-step movement to bring the blank 9 into registry with a head forming apparatus.

In the structure herein shown a tool carrier slide 12 is mounted for reciprocating movement on a support having gibs 13 forming guideways for the tool carrier, and as shown in Figure 2 of the drawing, said slide being operated as by a cam 14 connected with the slide by arms 15—16, a shaft 17 and a link 18. A motor 19 is supported on and carried by said slide, the shaft of the motor having a pinion meshing with a gear 20 secured to a heading shaft 21 rotatably mounted in a sleeve 22 extending within the neck 23 from a supporting head 24 mounted in a bearing 25 secured to and rising from a motor base plate 26 secured to the slide 12, and as shown in Figure 2 of the drawing. Hammers 27 are mounted for radial movement in the enlarged end of the shaft 21, the inner ends of said hammers projecting into a recess 28 in said enlarged end of the shaft and in operation being normally disposed outwardly of the receiving area in the head at the time of insertion of blanks in the head, thereby providing clearance for such insertion of said blanks and in position to strike against an object moved into said recess. The hammers are operated by actuators 29 in the form of rollers rotatably mounted in a ring 30 in the head 24, the peripheries of said rollers being located in the path of movement of the ends of the hammers 27, whereby the latter are plunged forcibly inward for impact against an object, as the head of the blank 9, located in the chamber 28, in a manner that will be readily understood by those skilled in the art, as the heading unit thus far described, except for its mounting and driving mechanism, is of well known construction.

In carrying my invention into effect I provide a mandrel 31 supported in an axial hole in the shaft 21, the outer end of said mandrel being of such shape in cross section as it is desired that the holes in the blanks shall have, as herein shown this shape being hexagonal. The opposite end of the mandrel has a head that engages a sleeve in the hole in the shaft and said head receives the thrust of a spring pressed plunger 32 located in said hole in the shaft 21, and as shown in Figure 1 of the drawing. This mandrel is free to rotate in either direction with the work 9. Its rotation is not controlled in any way by the motor or other part of the heading unit.

In the operation of the machine the end of the stock 8 is first operated upon by the cutting tool 7 that is moved to engage the blank by mechanism of any desired sort, not herein shown, and at the same time the drill 11 bores a hole in the end of said blank, and it is here remarked that the drill is mounted on a support secured to and carried by the slide 12. In the next one-step rotation of the spindle carrier the blank is presented opposite the recess 28 in the heading unit, and immediately thereafter the cam 14 moves the tool carrier slide forward, thereby projecting the head 10 on the blank into the recess 28 and between the hammers 27. The end of the mandrel is "squared" and the forward movement of the slide 12 in connection with the sring plunger 32 forces the mandrel into the hole formed by the drill in the blank to the full depth of the cylindrical part of the hole, that is, to the conical shaped bottom formed by the point of the drill, and before the blank has reached the point where it will be struck by the hammers.

When this point is reached the spring on the plunger 32 will permit the latter to be pressed backwardly, thus maintaining the end of the mandrel seated in the bottom of the hole until the tool carrier slide has been withdrawn far enough to remove the blank from the blows of the hammers.

The rotation of the shaft 21 causes the hammers to strike rapid blows in succession around the head end of the blank, and for the whole length of said head, and the mandrel being pressed against the bottom of the hole the latter will be formed to the shape of the mandrel and with full flat facets fully to the tapered bottom of said hole. This is of particular advantage for the reason that the tools to be inserted in the holes to turn the screws being of the same shape as the mandrel closely fit the holes for the full depth thereof. In order that the force applied by said tools to the screws to turn them shall be successfully withstood by the latter without rupture it is essential that the tools shall closely fit the holes to a certain depth, and if this depth extends to the bottom of the hole it is unnecessary to make the hole deeper than is required for this accurate fit. In methods heretofore employed, as by drawing broaching or extrusive operations, the proper shape of the hole is not obtained to the bottom thereof and consequently such holes must be made deeper in order to get the required depth for proper fit of the tools in the holes, the harder the metal the farther from the bottom will the angular shape terminate, and consequently the deeper must the hole be made. This weakens the screws in proportion to the amount of metal that is cut away in providing this added depth, and this objection is overcome by the present method in which the tools nicely fit the holes to the bottoms thereof and the screws are not weakened by making the holes deeper.

It will be noted that this machine enables a hollow headed screw to be formed at each cycle of movement of the machine, the tools beginning operations upon the end of a rod of stock, and the final operation consisting of separating the formed screw from said rod of stock. It is therefore not required to subject the blanks to operations upon different machines to finish the screws which is required by methods commonly employed at the present time.

In that adaptation of the invention illustrated in Figure 3 the formation of cap screws is shown. This operation is substantially the same as that hereinbefore set out with the exception that the tool 33 forms the head end of the blank to two different diameters, and in the second operation the hammers reduce the end to the next smaller diameter which is somewhat greater than that of the body 34 of the screw. In forming this type of screw the body is not threaded in the machine, such threading taking place in another machine after the blanks have been formed except as to such thread.

While reference has been made herein to the formation of hollow headed screws it will be understood that the operations may result in the formation not only of said screws, but also of cap screws, socket wrenches, tap extensions, pipe plugs, and various other articles of similar nature.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim:

1. The process for forming hollow-headed fasteners, that consists in the insertion of a shaping mandrel in a hole having a bottom in the end of a blank, and then applying blows successively in a path around the blank to force the metal closely against the mandrel at all points to form the hole to the same shape as that of the mandrel to the extreme bottom of the straight walled portion of said hole.

2. The process for forming hollow-headed fasteners, that consists in the insertion of a shaping mandrel in a hole having a bottom in the end of a blank having an enlarged head, and then subjecting said head to the action of hammers, under relative rotation as between the blank and hammers, to force the metal of the head closely against the mandrel at all points to form the hole for its full depth to the same shape as that of the mandrel to the extreme bottom of the straight walled portion of said hole.

3. The process for forming hollow-headed fasteners, that consists in the insertion of a shaping mandrel in a hole having a bottom in the end of a blank having an enlarged head, and then subjecting said head to the action of hammers, while the blank is rotated, to force the metal of the head closely against the mandrel to form the hole to the same shape as that of the mandrel to the extreme bottom of the straight wall portion of said hole.

4. The process for forming hollow-headed fasteners, that consists in the insertion of a shaping mandrel in a hole in the end of a blank having an enlarged head, exerting force in a direction lengthwise of the mandrel to press it into said hole, then subjecting said head to the action of hammers, under relative rotation as between the blank and hammers, to force the metal of the head closely against the mandrel to form the hole to the same shape as that of the mandrel throughout the full extent of the straight walled portion of said hole, and then threading the blank.

5. The process for forming hollow-headed fasteners, that consists in reducing the body of a blank to create an enlarged head, drilling a hole into the headed end of the blank, then inserting a mandrel in said hole then subjecting said head to the action of hammers under relative rotation as between the blank and hammers to form the hole throughout the extent of the straight walled portion thereof to the same shape as the mandrel and then threading said blank.

6. The process for forming hollow-headed fasteners, that consists in the simultaneous placing of the headed end of a blank between hammers and of a mandrel in a hole in said headed end, then applying blows rapidly around said head while relative rotation is effected as between the head and hammers to force the metal of the head closely against the mandrel to form said hole throughout the length of the straight walled portion thereof to the shape of a mandrel and then threading said blank.

MICHAEL H. FLYNN.